(12) United States Patent
Schleicher

(10) Patent No.: US 10,800,423 B2
(45) Date of Patent: Oct. 13, 2020

(54) MONITORING STEERING CONDITIONS OF AN OFF-ROAD VEHICLE

(71) Applicant: Deere & Company, Moline, IL (US)

(72) Inventor: Tyler D. Schleicher, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 248 days.

(21) Appl. No.: 15/900,454

(22) Filed: Feb. 20, 2018

(65) Prior Publication Data

US 2019/0256102 A1 Aug. 22, 2019

(51) Int. Cl.
| | | |
|---|---|---|
| B60W 40/064 | (2012.01) | |
| B60W 30/02 | (2012.01) | |
| B60W 40/114 | (2012.01) | |
| G05D 1/02 | (2020.01) | |
| E01C 19/00 | (2006.01) | |
| E02F 9/20 | (2006.01) | |
| B60W 40/00 | (2006.01) | |
| A01B 69/04 | (2006.01) | |

(52) U.S. Cl.
CPC ......... *B60W 40/064* (2013.01); *A01B 69/008* (2013.01); *B60W 30/02* (2013.01); *B60W 40/00* (2013.01); *B60W 40/114* (2013.01); *E01C 19/004* (2013.01); *E02F 9/2045* (2013.01); *G05D 1/0278* (2013.01); *B60W 2520/06* (2013.01); *B60W 2720/26* (2013.01)

(58) Field of Classification Search
CPC .... B60W 40/064; B60W 40/00; B60W 30/02; B60W 40/114; B60W 2520/06; B60W 2720/26; G05D 1/0278; E01C 19/004; A01B 69/008; E02F 9/2045
See application file for complete search history.

(56) References Cited

U.S. PATENT DOCUMENTS

| | | |
|---|---|---|
| 8,265,826 B2 | 9/2012 | Feller et al. |
| 8,340,438 B2 | 12/2012 | Anderson |
| 9,516,802 B2 | 12/2016 | Zemenchik |
| 9,615,501 B2 | 4/2017 | Pickett et al. |
| 9,708,001 B2 | 7/2017 | Arakane et al. |
| 9,740,208 B2 | 8/2017 | Sugumaran et al. |
| 9,821,847 B2 | 11/2017 | Robinson et al. |

(Continued)

OTHER PUBLICATIONS

Badua et al, Influence of Planter Downforce Setting and Ground Speed on Seeding Depth and Plant Spacing Uniformity of Corn, 14th International Conference on Precision Agriculture, dated Jun. 24-27, 2018, pp. 13.

(Continued)

*Primary Examiner* — Thomas G Black
*Assistant Examiner* — Ana D Thomas

(57) ABSTRACT

A stability index is determined based on the estimated position, the estimating heading, and the estimated yaw rate. A surface roughness estimator is adapted to estimate a variance or standard deviation of the roll of roll angle change based on the measured roll angle. A wheel-slip estimator estimates the wheel slip indicator based on numerator of drivetrain-derived wheel speed minus estimated velocity, which numerator is collectively divided by the drivetrain-derived wheel speed. A performance evaluation module determines a performance rating based on the determined stability index, the estimated surface roughness index and the estimated wheel slip.

19 Claims, 6 Drawing Sheets

(56) References Cited

U.S. PATENT DOCUMENTS

| | | |
|---|---|---|
| 10,219,421 B2 | 3/2019 | Achen et al. |
| 10,398,096 B2 | 9/2019 | Hassanzadeh et al. |
| 10,408,645 B2 | 9/2019 | Blank et al. |
| 2008/0269988 A1* | 10/2008 | Feller .................. G05D 1/0278 701/41 |
| 2011/0150348 A1 | 6/2011 | Anderson |
| 2015/0088381 A1 | 3/2015 | Imamura et al. |
| 2016/0029547 A1 | 2/2016 | Casper et al. |
| 2016/0334804 A1 | 11/2016 | Webber et al. |
| 2018/0057045 A1 | 3/2018 | Nykamp |
| 2018/0120133 A1 | 5/2018 | Blank et al. |
| 2019/0047573 A1* | 2/2019 | Herrera ............... B60W 40/109 |

OTHER PUBLICATIONS

European Search Report issued in counterpart application No. 19157429.2 dated Jul. 4, 2019, (6 pages).

\* cited by examiner

MONITORING STEERING CONDITIONS OF AN OFF-ROAD VEHICLE

FIELD

This disclosure relates to monitoring of steering conditions for an off-road vehicle.

BACKGROUND

In the prior art, satellite navigation receivers are used to steer or guide vehicles automatically by following a target path plan, such as an A-B guidance line defined by coordinate points A and B in a field or work area. For off-road vehicles, some ground or soil conditions can lead to variance from tracking at the target path plan. For example, if a field has been subjected to deep tillage, surface irregularities, like ruts, may cause the vehicle's tires to slip or deviate from the target path plan. In some cases, crop residue, other vegetation, or poor visibility (e.g., fog), can conceal surface irregularities to the operator of the vehicle. Thus, there is a need for ground condition evaluation for a vehicle steering system of an off-road vehicle.

SUMMARY

In accordance with one embodiment, a monitoring system for monitoring steering conditions of a vehicle (e.g., off-road vehicle) comprises a location-determining receiver for estimating a position and velocity of the vehicle and a yaw or heading of the vehicle. An inertial measurement unit can estimate a yaw rate for the vehicle. A stability index is determined based on the estimated position, the estimating heading, and the estimated yaw rate. An accelerometer is configured to measure roll angle of the vehicle. A surface roughness estimator is adapted to estimate a variance or standard deviation of the roll of roll angle change based on the measured roll angle. A rotational speed sensor is configured to measure a drivetrain-derived wheel speed. A wheel-slip estimator estimates the wheel slip indicator (e.g., or percent wheel slip derived therefrom) based on numerator of drivetrain-derived wheel speed (e.g., sensor wheel speed) minus estimated velocity, which numerator is collectively divided by the drivetrain-derived wheel speed. A performance evaluation module determines a performance rating based on the determined stability index, the estimated surface roughness index, and the estimated wheel slip.

DETAILED DESCRIPTION

Figure 1:
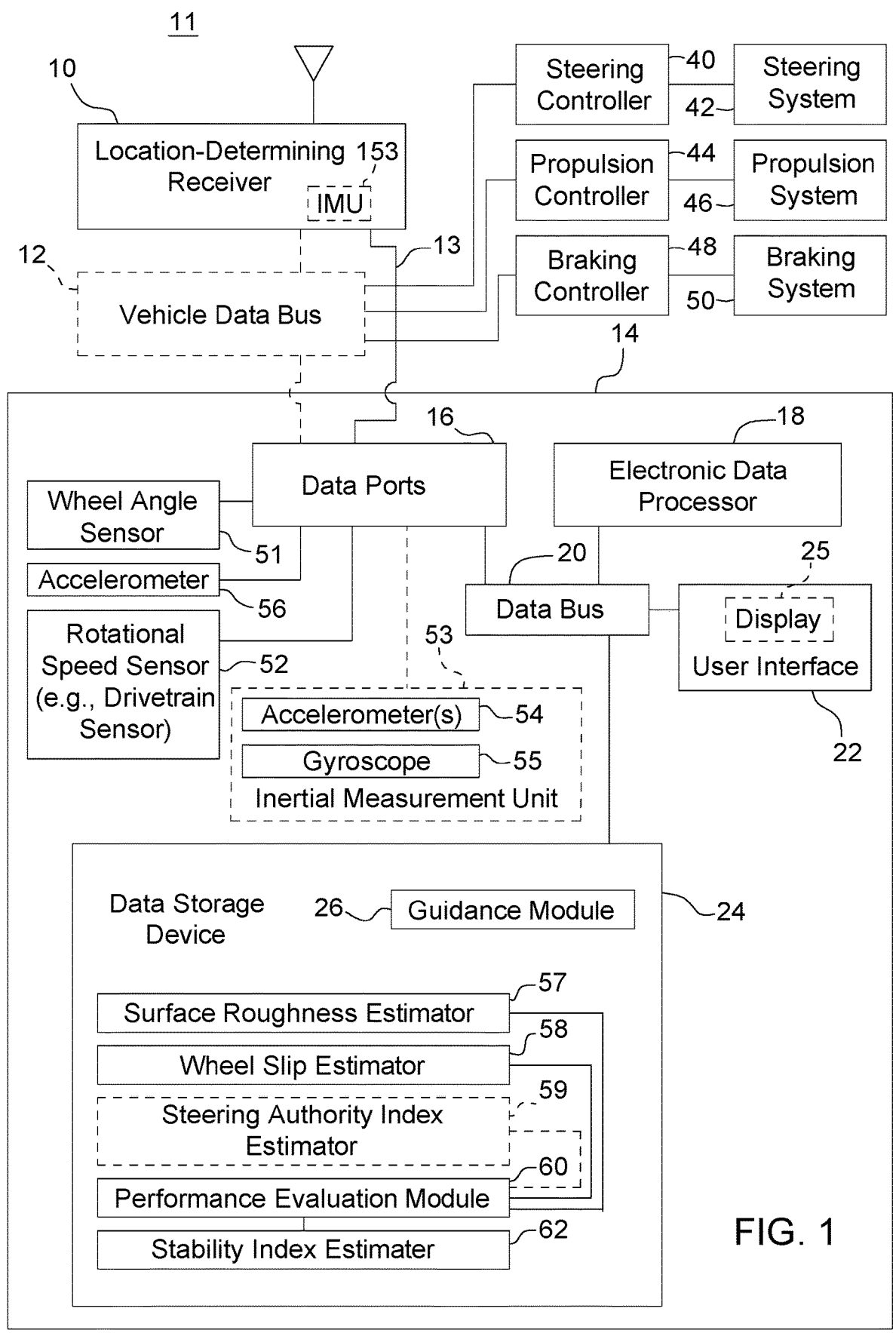
FIG. 1 is a block diagram of a monitoring system for monitoring steering conditions of a vehicle.

In FIG. 1 in accordance with one embodiment, a monitoring system 11 for monitoring steering conditions of a vehicle (e.g., off-road vehicle) comprises a location-determining receiver 10 for estimating a position and velocity of the vehicle and a yaw or heading of the vehicle. An optional separate inertial measurement unit (IMU) 53 may be separate from the location-determining receiver 10 or an optional integral IMU 153 may be integrated with the location determining receiver 10. The optional nature of the separate IMU 53 and the integral IMU 153 is indicated by dashed lines in FIG. 1. The separate IMU 53 or the integral IMU 153 can estimate a yaw rate for the vehicle.

A stability index is determined based on the estimated position, the estimating heading, and the estimated yaw rate. An accelerometer 56 is configured to measure roll angle of the vehicle. A surface roughness estimator 57 is adapted to estimate a surface roughness of the ground as a variance or standard deviation of the roll of roll angle change based on the measured roll angle. For example, surface roughness estimator 57 may estimate a surface roughness as 95% of the roll angle rate.

A rotational speed sensor 52 is configured to measure a drivetrain-derived wheel speed. A wheel-slip estimator 58 estimates the wheel slip indicator based on drivetrain-derived wheel speed and the estimated velocity, which is provided by the location-determining receiver 10. A wheel-slip estimator 58 estimates the wheel slip indicator based on numerator of drivetrain-derived wheel speed (e.g., sensor wheel speed) minus estimated velocity, which numerator is collectively divided by the drivetrain-derived wheel speed. A performance evaluation module 60 determines a performance rating based on the determined stability index, the estimated surface roughness index and the estimated wheel slip. The steering conditions are correlated to or derived from the ground conditions.

Here, in one example the steering conditions and ground conditions are derived from a combination of the following parameters: surface roughness, stability index, and wheel slip. In an alternate embodiment, the performance evaluation module 60 may use an optional steering authority index estimator 59 in conjunction with the surface roughness, stability index and wheel slip. Each of the above parameters is given a threshold or range for good, marginal and degraded in terms of how severe it may affect the performance of a steering system 42. If the performance rating is indicated as marginal or degraded, the steering system 42 will not be able to achieve optimal performance until the operational status or performance rating is improved.

In FIG. 1, the monitoring system 11 is capable of monitoring, evaluating, and reporting in real time steering conditions of a vehicle, such as an off-road vehicle, to an operator via a display 25 of the vehicle. In an alternate embodiment, the user interface 22 and display may be located remotely from the vehicle via a wireless link to support remote control or tele-operation of the vehicle by the operator.

In one embodiment, the monitoring system 11 comprises an electronic data processing system 14 that is coupled to a location-determining receiver 10 directly, or via a vehicle data bus 12. The optional connection via vehicle data bus 12 is shown in dashed lines because it is optional and the connection between the electronic data processing system 14 and location-determining receiver 10 may be direct, as indicated by transmission line 13, which can be used separately or cumulatively with the interconnection via the vehicle data bus 12.

In one embodiment, the electronic data processing system 14 comprises an electronic data processor 18, one or more data ports 16, a user interface 22 and a data storage device 24 coupled to a data bus 20. The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device. The data storage device 24 may comprise one or more of the following: electronic memory, nonvolatile electronic memory, an optical data storage device, a magnetic data storage device, or other device for storing digital or analog data.

In one embodiment, the data storage device 24 may store, retrieve, read and write one or more of the following items: a guidance module 26, a surface-roughness estimator 57, a wheel-slip estimator 58, a steering-authority index 59, a performance evaluation module 60, or a stability index estimator 62. A module means software, electronics, or both.

As illustrated, a wheel-angle sensor 51, an optional accelerometer 56, a rotational speed sensor 52 (e.g., a drivetrain sensor), an optional inertial measurement unit (53 or 153), and a location-determining receiver 10 are coupled to the data ports 16. The electronic data processing system 14 communicates to data ports 16 directly, or indirectly via the data bus 20.

In one embodiment, the optional IMU 53 is a separate device, whereas in other embodiments, the IMU 153 is integral with the location-determining receiver 10. The optional separate IMU 153 comprises one or more accelerometers 56 and a gyroscope 55, where the accelerometers 56 may be arranged on orthogonal axes with respect to each other to facilitate detection of vehicle attitude, such as roll angle, pitch angle and yaw angle of a vehicle.

The data port 16 may comprise a data transceiver, buffer memory, or both. The user interface 22 may comprise one or more of the following: a display 25 (e.g., display), a touch screen display, a keypad, a keyboard, a control panel, a pointing device (e.g., electronic mouse), or another device for entry or output of data from the data processing system 14.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver 10 or its memory or data storage to perform certain functions, or (3) electronic, electrical circuits or modules that can perform substantially equivalent functions to the software, embedded firmware or program instructions.

In one configuration, the guidance module 26 controls the vehicle to track or follow linear path plan, a curved path plan, a contour path plan, a spiral path plan or other path plan. In the automated guidance mode, in certain vehicle configurations the guidance module 26 can control the steering, propulsion, and braking of the vehicle. For example, in the automated guidance mode, the guidance module 26 can communicate with one or more of the following controllers to direct and guide the vehicle: steering controller 40, propulsion controller 44 and braking controller 48.

In FIG. 1, the steering controller 40, the propulsion controller 44 and the braking controller 48 are coupled to the vehicle data bus 20. For example, the data processing system 14 can communicate with the steering controller 40, the propulsion controller 44 and the braking controller 48, and vice versa. In one embodiment, the steering controller 40 is coupled to the steering system 42, such as an electrical motor or electrohydraulic device that is mechanically coupled to a steering mechanism (e.g., rack-and-pinion or Ackerman steering system) for controlling the angular orientation of one or more wheels about a generally vertical axis. In one embodiment, the propulsion controller 44 may comprise an electronic engine controller for controlling a throttle or fuel metering system of a propulsion system 46, such as internal combustion engine. In another embodiment, a propulsion controller 44 may comprise an inverter or motor controller for controlling a propulsion system 46, such as a drive motor of a hybrid or electric vehicle. In one embodiment, the braking controller 48 interfaces with a braking system 50, such as hydraulic braking system, an electrohydraulic braking system, a cable braking system, or an electromechanical braking system to stop or decelerate the vehicle.

In one embodiment, the location-determining receiver 10 provides one or more of the following types of data for a vehicle: heading data, velocity data, and location data (e.g., two or three dimensional coordinates). The location-determining receiver 10 may comprise a satellite navigation receiver, a Global Navigation Satellite System (GNSS) receiver, a Global Positioning System (GPS) receiver, or another receiver for determining position data, velocity data, and heading data for the vehicle. For example, the location-determining receiver 10 may comprise a satellite navigation receiver with differential correction for providing precise position data, velocity data and heading data for the vehicle. A separate receiver or transceiver (e.g., satellite, cellular, or wireless device) may receive the correction data or differential correction data via a wireless signal transmitted from a satellite or a terrestrial base station (e.g., real-time kinematic (RTK) base station). As used herein, heading can refer to: (1) an angular direction of travel of the vehicle with reference to due North or magnetic North, or (2) a yaw or yaw angle of the vehicle with reference to coordinate system, such as a Cartesian coordinate system.

In one embodiment, a location-determining receiver 10 provides location data, path heading data, vehicle heading data, or velocity data along target path or path plan to the data processing system 14 or guidance module 26.

In one configuration to determine the performance rating, the data processor 18 classifies the determined stability index into three separate and distinct stability rating ranges; the data processor 18 classifies the estimated surface roughness index into three separate and distinct roughness rating ranges, and the data processor 18 classifies the wheel slip indicator rating into three separate and distinct rating ranges. In one embodiment, the rating ranges are associated with an optimal range, a marginal range and degraded range.

The surface roughness estimator 57 can operate in accordance with various techniques that may be applied alternately or cumulatively. Under a first technique, the surface roughness estimator 57 determines estimated surface roughness index based on a measure of roll angle rate variability. Under a second technique, the surface roughness estimator 57 determines estimated surface roughness index based on a standard deviation of the rate of roll angle change with respect to time.

In one embodiment, the stability evaluator or stability index estimator 62 is arranged to set the estimated stability index in accordance with the following equation if a lateral error in the position of the vehicle is less than a tracking threshold, if the estimated heading error is less than a heading error threshold, and if the estimated yaw rate is less than a yaw rate threshold:

$$S = \frac{Y - Y_T}{Y_T}\left(\frac{H - H_T}{H_T}\right)\left(\frac{L - L_T}{L_T}\right),$$

where S is the scalar estimated stability index, Y is the estimated yaw rate, $Y_T$ is the yaw rate threshold, H is the heading error and $H_T$ is the heading error threshold, L is the lateral error and $L_T$ is the lateral error threshold. However, the stability index estimator 62 is adapted to set the estimated stability index to zero where the above equation is not applied. For example, the stability index indicator 62 may set the estimated stability index to zero during acquisition of a target guidance path of the vehicle and wherein the stability index estimator is adapted to increase the estimated stability index after acquisition of the target guidance path with less than a lateral error from the target guidance path.

In one embodiment, the wheel slip estimator 58 determines a percent wheel slip where the wheel slip estimator multiplies the wheel slip indicator by 100. The wheel slip indicator estimates vehicle velocity with respect to the ground in two distinct ways to estimate wheel slip. First, the wheel slip estimator 58, electronic data processor 18 or location-determining receiver 10 estimates an estimated velocity based on output of the location-determining receiver 10, such as three dimensional velocity vectors and position of the vehicle that are estimated by the location-determining receiver 10 (e.g., Global Positioning System (GPS) receiver or other Global Navigation Satellite System (GNSS) receiver with or without differential correction or precise point position correction). Second, the rotational speed sensor 52 observes to the speed of the wheels of the vehicle and converts the speed of the wheels to a ground velocity based on geometric conversions associated with tire size and gear ratios of the drive train. For instance, the rotation speed sensor 52 can be associated with a transmission of the vehicle. Third, the ratio of the sensor-estimated ground speed minus the receiver-estimated velocity (as the denominator) and the sensor-estimated ground speed (as the numerator) represents the wheel slip, which can be multiplied by 100 to derive the percent wheel slip in accordance with the following equation:

$$Wheelslip\ \% = \frac{Wheel\ Speed - GPS\ Speed}{Wheel\ Speed} * 100,$$

where the sensor-estimated ground speed is the Wheel Speed, where the GPS Speed is the receiver-estimated velocity, and where the above ratio $$\left(\frac{Wheel\ Speed - GPS\ Speed}{Wheel\ Speed}\right)$$

is referred to as the wheel slip indicator.

In an alternate embodiment, the performance evaluation module 60 may determine a performance rating based on contributions of one or more of the following components: surface roughness estimate, wheel slip (e.g., percent wheel slip or wheel slip ratio), stability index estimate and a steering authority index. The steering authority index estimator 59 estimates a steering authority index based on the correlation (R-squared) of desired vehicle curvature (wheel angle/wheel base) to actual vehicle curvature (yaw-rate/location-determining receiver-provided speed) plus a time delta. In accordance with one embodiment, the steering authority index estimator 59 calculates of the steering authority index in an iterative process where the time delta is repeatedly shifted and checked for the best correlation (R-squared value) achievable within a reasonable maximum search time period or convergence time. After the steering authority index estimator 59 determines the optimum or target time delta, the target time delta and its associated correlation (R-squared) could be assessed to be a corresponding performance level or performance range (good, marginal or bad) based on empirical results from other similar vehicles or fleet data of a fleet of similar vehicles.

Figure 2:
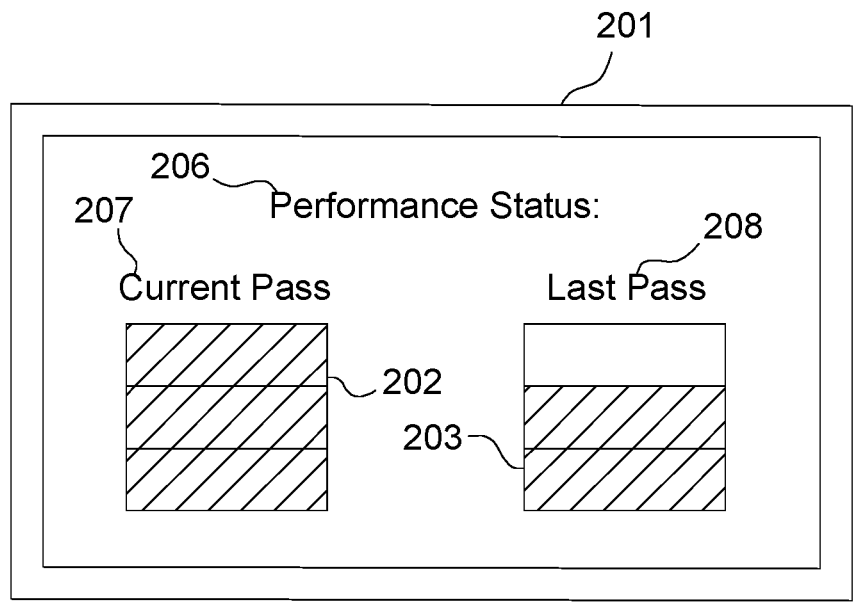
FIG. 2 illustrates an exemplary first screen shot of a display associated with the monitoring system.

In one embodiment, a display 25 is configured for displaying the determined performance rating to a user of the vehicle in real time. FIG. 2 illustrates an exemplary first screen shot 201 of a display 25 associated with the monitoring system. FIG. 2 illustrates the determined performance rating as a performance status 206 of the current pass 207 (e.g., current row) or last pass 208 (e.g., last row or previous row). As illustrated, on the left portion of the screen, the current pass 207 has a greater performance rating than the last pass 208 on the right portion of the screen. In particular, the current pass 207 has an optimal rating 202 (e.g., high height of bar), whereas the last pass 208 has an acceptable rating 203 (e.g., medium height of bar), normal rating or marginal rating.

Figure 3:
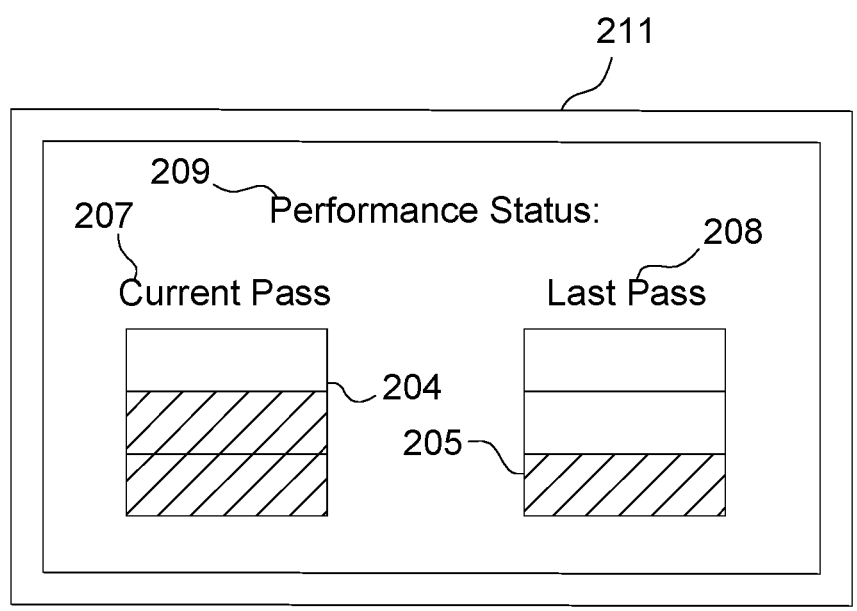
FIG. 3 illustrates an exemplary second screen shot of a display associated with the monitoring system.

FIG. 3 illustrates an exemplary second screen shot 211 of a display 25 associated with the monitoring system 11. As illustrated, on the left portion of the screen, the current pass 207 has a greater performance rating than the last pass 208 on the right portion of the screen. In particular, the current pass 207 has an acceptable rating 204 (e.g., medium height of bar), normal rating or marginal rating, whereas the last pass 208 has a degraded rating or below average rating (e.g., low height of bar).

Figure 4:
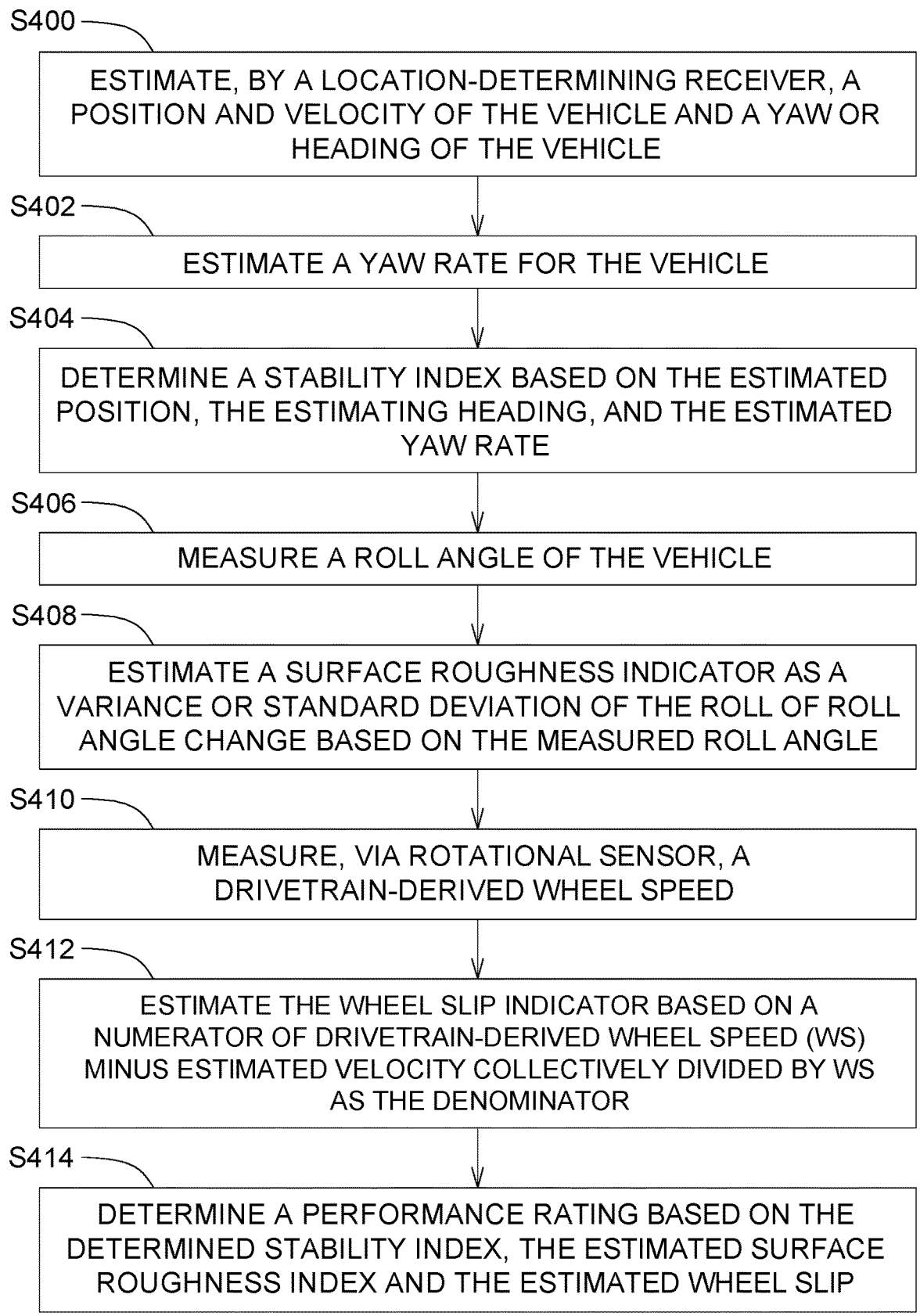
FIG. 4 is one embodiment of a flow chart of a monitoring system for monitoring steering conditions of a vehicle.

FIG. 4 is one embodiment of a flow chart of a monitoring system 11 for monitoring steering conditions of a vehicle. The method of FIG. 4 begins in step S400.

In step S400, a location-determining receiver 10 estimates a position and velocity of the vehicle and a yaw or heading of the vehicle. The location-determining receiver 10 communicates the estimated position, velocity and yaw or heading to the electronic data processing system 14 via the vehicle data bus 12 or via a transmission line 13.

In step S402, an inertial measurement unit (53 or 153) can estimate a yaw rate for the vehicle. As previously indicated, the inertial measurement unit (53 or 153) may be integrated into the location-determining receiver 10 or may be separate stand-alone device. The location-determining receiver 10 or optional inertial measurement unit 153 can communicate the yaw rate to the electronic data processing system 14 via the vehicle data bus 12 or via a transmission line 13.

In step S404, a stability index estimator 62 or an electronic data processor 18 determines a stability index based on the estimated position, the estimated heading, and the estimated yaw rate. To support the stability index estimator 62, the location-determining receiver 10 and optional IMU (53 or 153) can communicate the estimated position, the estimated heading and the estimated yaw rate for each successive sampling interval (as the vehicle progresses through the work area or field) to the electronic data processor 18 and the data storage device 24 via the data ports 16 and data bus 20. In one example, the stability index estimator 62 is estimated in accordance with the following equation if a lateral error in the position of the vehicle is less than a tracking threshold, if the estimated heading error is less than a heading error threshold, and if the estimated yaw rate is less than a yaw rate threshold:

$$S = \frac{Y - Y_T}{Y_T}\left(\frac{H - H_T}{H_T}\right)\left(\frac{L - L_T}{L_T}\right),$$

where S is the scalar estimated stability index, Y is the estimated yaw rate, $Y_T$ is the yaw rate threshold, H is the heading error and $H_T$ is the heading error threshold, L is the lateral error and $L_T$ is the lateral error threshold. In another example, the estimated stability index is set to zero during acquisition of a target guidance path of the vehicle and wherein the stability evaluator is adapted to increase the estimated stability factor after acquisition of the target guidance path with less than a lateral error from the target guidance path.

In step S406, an accelerometer 56 or IMU (53, or 153) is configured to measure roll angle of the vehicle. For example, the accelerometer 56 may comprise one or more separate accelerometers 56, one or more accelerometers 54 within in the IMU 53, or an accelerometer within the location determining receiver or within the IMU 153. In one configuration, the accelerometer 56 comprises a set of three accelerometers arranged on three corresponding orthogonal axes. In one example of step S406, the accelerometer 56 or IMU (53 or 153) may measure both the roll angle and the corresponding roll angle rate or roll angle change versus time for each successive sampling interval that is processed by the electronic data processing system 14.

In step S408, a surface roughness estimator 57 or data processor 18 is adapted to estimate a surface roughness as a variance or standard deviation of the roll angle or the roll angle change based on the measured roll angle for each sampling interval. The surface roughness estimator 57 or data processor 18 estimates a surface roughness of the ground for each sampling interval in accordance with various techniques, which may be applied separately or cumulatively. Under a first technique, the surface roughness estimator 57 or data processor 18 estimates the surface roughness index of the ground based on a measure of roll angle rate variability for each (rolling) sampling interval. Under a second technique, the surface roughness estimator 57 or data processor 18 estimates the surface roughness index based on a standard deviation of the rate of roll angle change with respect to time.

In step S410, a rotational speed sensor 52 is configured to measure a drivetrain-derived wheel speed, an odometer provided ground speed, a dead-reckoning provided ground speed, or a sensor-provided ground speed. For instance, the rotational speed sensor 52 may be associated with or driven by a transmission gear that rotates or drives a wheel of the vehicle in contact with the ground. Other configurations, may include a take-off gear or shaft from an electric drive motor or drive motor hub on a hybrid or electrically propelled vehicle.

In step S412, a wheel-slip estimator 58 first estimates the wheel slip indicator or ratio based on the sensor-estimated ground wheel speed (e.g., drivetrain-derived wheel speed or WS) minus the receiver-estimated velocity (collectively, the numerator of a ratio) divided by the sensor-estimated ground wheel speed (denominator of the ratio). Second, the wheel slip indicator can be multiplied by 100 to derive the percent wheel slip in accordance with the following equation:

$$Wheelslip~\% = \frac{Wheel~Speed - GPS~Speed}{Wheel~Speed} * 100,$$

where the sensor-estimated ground wheel speed is the Wheel Speed, where the GPS Speed is the receiver-estimated velocity, and where the above ratio $$\left(\frac{Wheel~Speed - GPS~Speed}{Wheel~Speed}\right)$$

is referred to as the wheel slip indicator.

In one configuration, the location-determining receiver 10, the data processor 18, or the wheel-slip indicator estimator 58 determines estimated velocity based on three-dimensional velocity vectors and position of the vehicle. For example, the rotational speed of the wheel or wheels of the vehicle is based on application of geometric conversions associated with tire size and gear ratios of the drive train to the observed rotational sensor data, or based on empirical measurements or tests.

In step S414, a data processor 18 or performance evaluation module 60 determines a performance rating based on the determined stability index, the estimated surface roughness index and the estimated wheel slip. Step S414 may be executed in accordance with various techniques, which may be applied separately or cumulatively.

Under a first technique, the determined stability index may contribute a first numerical rating within a respective range, the estimated surface roughness may contribute a second numerical rating with a respective range, and the estimated wheel slip may contribute a third numerical rating within a respective range.

Under a second technique, the first, second, and third numerical ratings may be combined by adding them together, on a weighted or unweighted basis, achieve an aggregate value indicative of the performance rating. For instance, the weighted basis would have a multiplier within the range of 0 to 1 for each of the first, second and third numerical ratings, where the value of the multiplier may be determined by empirical measurements or field tests.

Under a third technique, the determined stability index may contribute a first verbal rating or first rank within a respective range, the estimated surface roughness may contribute a second verbal rating or second rank with a respective range, and the estimated wheel slip may contribute a third verbal rating or third rank within a respective range.

Under a fourth technique, the determined stability index is classified into three separate and distinct stability rating ranges; the estimated surface roughness index is classified into three separate and distinct roughness rating ranges, and the estimated wheel slip indicator rating is classified into three separate and distinct rating ranges. In one example, the rating ranges may be classified or grouped into a low performance level range, an acceptable performance level range and a high performance level range. In another example, the rating ranges may be classified or grouped into an optimal range, a marginal range and degraded range.

Figure 5:
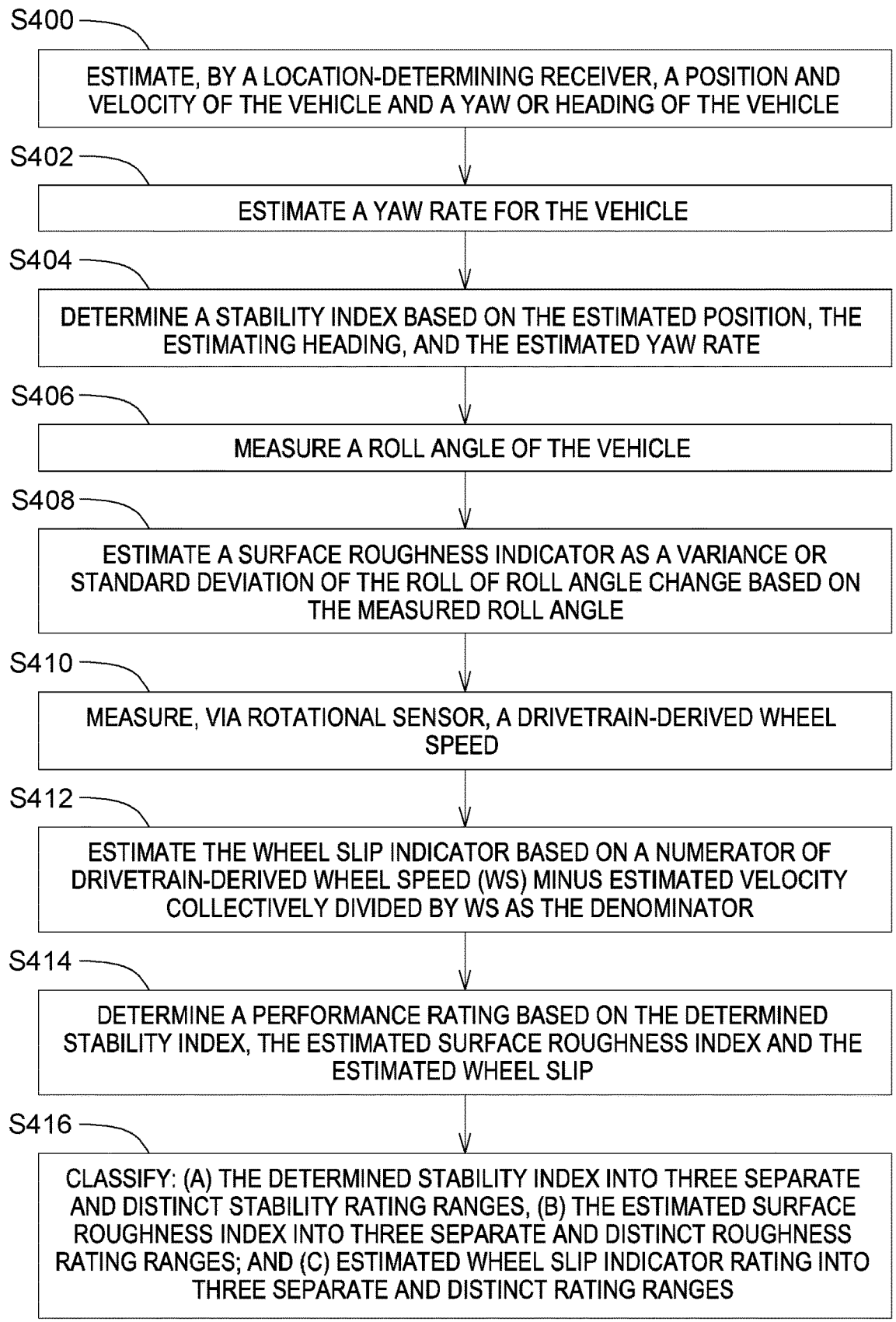
FIG. 5 is another embodiment of a flow chart of a monitoring system for monitoring steering conditions of a vehicle.

The method of FIG. 5 is similar to the method of FIG. 4, except the method of FIG. 5 further comprises step S416. Like references indicate like steps or procedures in FIG. 4 and FIG. 5.

Step S416 may be executed after, before or simultaneously with step S414. In step S416, the data processor 18 or the performance evaluation module 60 classifies the determined stability index into three separate and distinct stability rating ranges; the data processor 18 or the performance evaluation module 60 classifies the estimates surface roughness index into three separate and distinct roughness rating ranges, and the data processor 18 or the performance evaluation module 60 classifies the estimated wheel slip indicator rating into three separate and distinct rating ranges. In one example, the rating ranges may be classified or grouped into a low performance level range, an acceptable performance level range and a high performance level range. In another example, the rating ranges may be classified or grouped into an optimal range, a marginal range and degraded range.

In step S414 or step S416, the performance evaluation module 60 or data processor 18 may combine a first rating range of a respective determined stability index, a second rating range of a respective surface roughness index, and a third rating range of a respective wheel slip indicator (e.g., ratio or percentage of wheel slip). For example, the performance evaluation module 60 or data processor 18 may equal weight the contributions (or assign different weight contributions) from the stability index, the surface roughness index and the wheel slip indicator to derive an aggregate performance rating that is representative of steering conditions for the off-road vehicle with respect to a work area or field.

Figure 6:
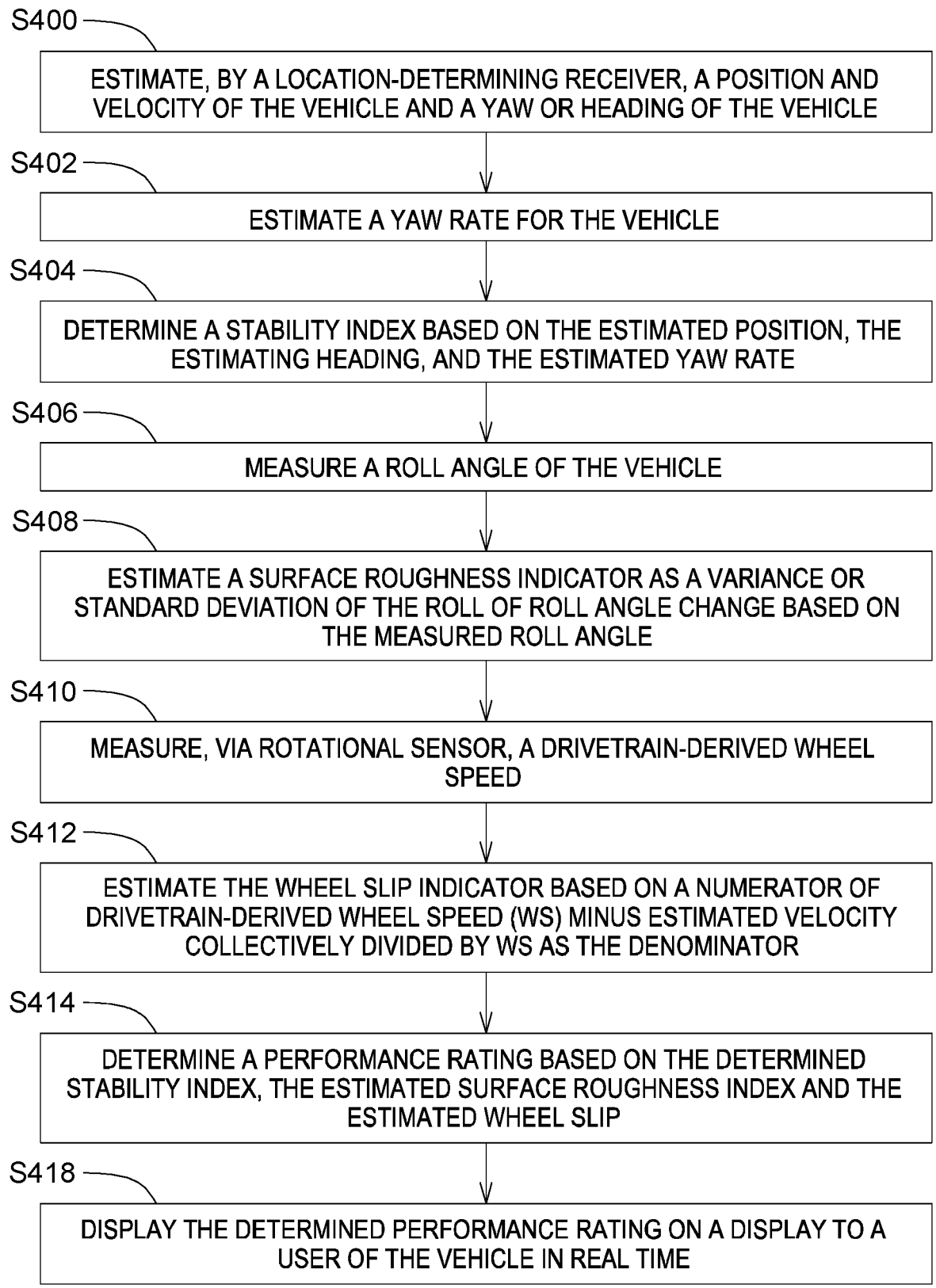
FIG. 6 is yet another embodiment of a flow chart of a monitoring system for monitoring steering conditions of a vehicle.

The method of FIG. 6 is similar to the method of FIG. 4, except the method of FIG. 6 further comprises step S418. Like references indicate like steps or procedures in FIG. 4 and FIG. 6. Step S418 may be executed during or after step S414. In step S418, the data processor 18 or display 25 displays the determined performance rating (e.g., in step S414) on a display 25 to a user of the vehicle in real time.

Figure 7:
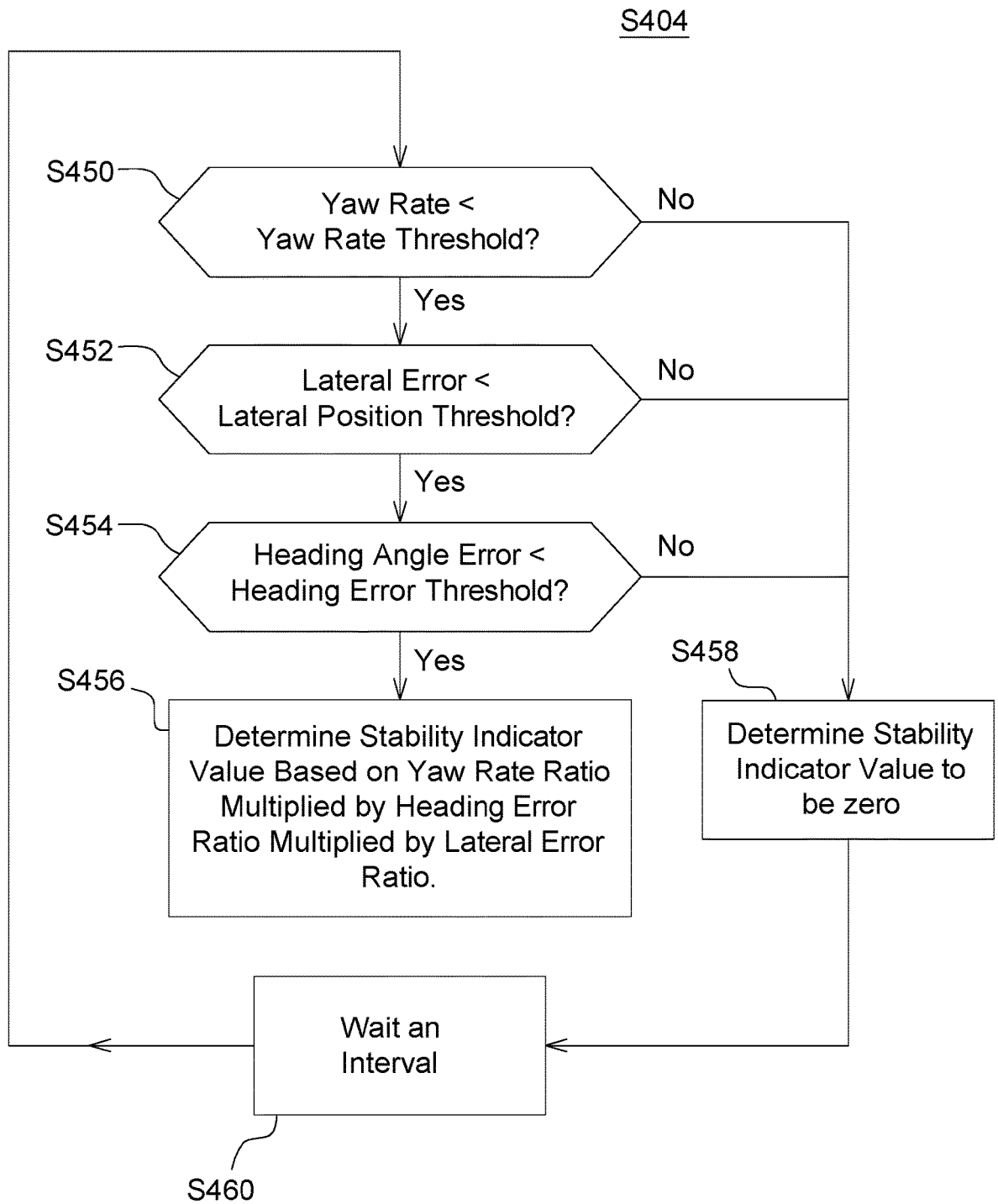
FIG. 7 is still another embodiment of a flow chart of a monitoring system for monitoring steering conditions of a vehicle.

The method of FIG. 7 describes an illustrative example of step S404 of FIG. 4 in greater detail. The method of FIG. 7 begins in step S450.

In step S450, the data processor 18 or stability index estimator 62 determines whether the observed estimated yaw rate is less than a yaw rate threshold for a sampling interval or the next sampling interval. If the observed estimated yaw rate is less than a yaw rate threshold, then the method continues with step S452. However, if the estimated yaw rate is not less than the yaw rate threshold, then the method continues with step S458.

In step S452, the data processor 18 or stability index estimator 62 determines whether the observed estimated lateral error is less than a lateral position threshold for the sampling interval or the next sampling interval. The location-determining receiver 10 may provide the estimated lateral error as a vector difference between three-dimensional target coordinates of a target path plan and observed three-dimensional coordinates of the vehicle during the sampling interval. If the estimated lateral error is less than a lateral position threshold, the method continues with step S454. However, if the lateral error is not less than the lateral position threshold, then the method continues with step S458.

In step S454, the data processor 18 or stability index estimator 62 determines whether the determined heading angle error is less than a heading error threshold for a sampling interval or the next sampling interval. If the determined heading angle error is less than the heading error threshold, the method continues with step S456. However, if the determined heading angle error is not less than the heading error threshold, then the method continues with step S458.

In step S456, the data processor 18 or stability index estimator 62 determines the stability indicator value based on a yaw rate ratio multiplied by a heading error ratio, which is further multiplied by the lateral error ratio. For example, the yaw rate ratio may be expressed as:

$$\frac{Y - Y_T}{Y_T}$$

where Y is the estimated yaw rate and $Y_T$ is the yaw rate threshold. Similarly, the heading error ratio may be expressed as:

$$\left(\frac{H - H_T}{H_T}\right),$$

where H is the heading error and $H_T$ is the heading error threshold. Finally, the lateral error ratio may be expressed as:

$$\left(\frac{L - L_T}{L_T}\right),$$

where L is the lateral error and $L_T$ is the lateral error threshold.

Accordingly, $$S = \frac{Y - Y_T}{Y_T}\left(\frac{H - H_T}{H_T}\right)\left(\frac{L - L_T}{L_T}\right),$$

where S is the scalar estimated stability factor, here Y is the estimated yaw rate and $Y_T$ is the yaw rate threshold, H is the heading error and $H_T$ is the heading error threshold, L is the lateral error and $L_T$ is the lateral error threshold.

In step S458, the data processor 18 or the stability indicator determines or sets the stability indicator value to be equal to zero. In another embodiment, in step S458 the stability index indicator determines are sets the stability indicator value to be equal to a constant value that is lower than a threshold stability indicator value.

In step S460, the data processor 18 or stability index indicator weights for a time interval prior to returning to step S450.

This document describes various illustrative embodiments which can be varied in many ways. Such variations are not to be regarded as a departure from the spirit and scope of illustrative embodiments, and all such variations or modifications as would be obvious to one skilled in the art are intended to be included within the scope of the claims.

The following is claimed:

1. A monitoring system for monitoring steering conditions of a vehicle, the system comprising:
   a location-determining receiver configured to estimate a position and velocity of the vehicle and a yaw or heading of the vehicle for a corresponding sampling interval;

an inertial measurement unit configured to estimate a yaw rate for the vehicle for the sampling interval;

a stability index estimator configured to determine a stability index based on the estimated position, the estimating heading, and the estimated yaw rate for the sampling interval;

an accelerometer for measuring roll angle of the vehicle for the sampling interval;

a surface roughness estimator adapted to estimate a surface roughness index as a variance or standard deviation of a roll angle change, based on the measured roll angle for the sampling interval, wherein the variance refers to a square of the standard deviation and wherein the standard deviation refers to the square root of the mean of the squares of the deviations from the arithmetic mean of a distribution of measured roll angle change versus time for each successive sampling interval;

a rotational speed sensor configured to measure a drivetrain-derived wheel speed for the sampling interval;

a wheel slip estimator configured to estimate the wheel slip indicator based on a numerator of drivetrain-derived wheel speed minus estimated velocity, which numerator is collectively divided by the drivetrain-derived wheel speed of the denominator; and a performance evaluation module configured to determine a performance rating based on the determined stability index, the estimated surface roughness index and the estimated wheel slip for the sampling interval, the performance rating configured to be displayed on a display of the vehicle; the stability index estimator, the surface roughness estimator, the wheel slip estimator, and the performance evaluation module comprising software or program instructions that are stored in a data storage device executable by an electronic data processor of the system.

2. The system according to claim 1 wherein the determined stability index is classified into three separate and distinct stability rating ranges, wherein the estimated surface roughness index is classified into three separate and distinct roughness rating ranges, and wherein the estimated wheel slip indicator rating is classified into three separate and distinct rating ranges.

3. The system according to claim 2 wherein the rating ranges are associated with an optimal range, a marginal range and degraded range.

4. The system according to claim 1 wherein the surface roughness estimator determines estimated surface roughness index based on a measure of roll angle rate variability.

5. The system according to claim 1 wherein the stability index estimator is arranged to set the estimated stability index in accordance with the following equation if a lateral error in the position of the vehicle is less than a tracking threshold, if the estimated heading error is less than a heading error threshold, and if the estimated yaw rate is less than a yaw rate threshold:

$$S = \frac{Y-Y_T}{Y_T}\left(\frac{H-H_T}{H_T}\right)\left(\frac{L-L_T}{L_T}\right),$$

where S is the scalar estimated stability index, Y is the estimated yaw rate, $Y_T$ is the yaw rate threshold, H is the heading error, $H_T$ is the heading error threshold, L is the lateral error and $L_T$ is the lateral error threshold.

6. The system according to claim 1 wherein the stability index estimator is adapted to set the estimated stability index to zero during acquisition of a target guidance path of the vehicle and wherein the stability index estimator is adapted to increase the estimated stability factor after acquisition of the target guidance path with less than a lateral error from the target guidance path.

7. The system according to claim 1 wherein the wheel slip estimator determines a percent wheel slip as the wheel slip by multiplied the wheel slip indicator by 100.

8. The system according to claim 1 wherein the estimated velocity determined by the location-determining receiver is based on three dimensional velocity vectors and position of the vehicle, and wherein the rotational speed sensor is associated with a transmission of the vehicle and is converted to the speed of the wheels of the vehicle based on geometric conversions associated with tire size and gear ratios of the drive train.

9. The system according to claim 1 further comprising the display for displaying the determined performance rating to a user of the vehicle in real time.

10. A monitoring method for monitoring steering conditions of a vehicle, the method comprising:

estimating, by a location-determining receiver, a position and velocity of the vehicle and a yaw or heading of the vehicle;

estimating a yaw rate for the vehicle;

determining a stability index based on the estimated position, the estimating heading, and the estimated yaw rate;

measuring a roll angle of the vehicle;

estimating a surface roughness index as a variance or standard deviation of a roll angle change based on the measured roll angle, wherein the variance refers to a square of the standard deviation and wherein the standard deviation refers to the square root of the mean of the squares of the deviations from the arithmetic mean of a distribution of measured roll angle change versus time for each successive sampling interval;

measuring, via rotational sensor, a drivetrain-derived wheel speed;

estimating the wheel slip indicator based on a numerator of drivetrain-derived wheel speed minus estimated velocity, which numerator is collectively divided by the drivetrain-derived wheel speed of the denominator;

determining a performance rating based on the determined stability index, the estimated surface roughness index and the estimated wheel slip indicator, the performance rating displayed on a display of the vehicle; wherein the performance rating is associated with a current pass or last pass of the vehicle progressing through a work area; wherein in the stability index and the performance rating are determined by an electronic data processor; and wherein the surface roughness indicator and the wheel slip indicator are estimated by the electronic data processor.

11. The method according to claim 10 further comprising:

classifying the determined stability index into three separate and distinct stability rating ranges, wherein the estimated surface roughness index is classified into three separate and distinct roughness rating ranges, and wherein the estimated wheel slip indicator rating is classified into three separate and distinct rating ranges.

12. The method according to claim 11 wherein the rating ranges are associated with an optimal range, a marginal range and degraded range.

13. The method according to claim 10 wherein the estimating of the surface roughness comprises determining the estimated surface roughness index based on a measure of roll angle rate variability.

14. The method according to claim 10 wherein a lateral error is evaluated with respect to a lateral error threshold and the stability factor is estimated in accordance with the following equation if the lateral error in the position of the vehicle is less than the lateral error threshold, if the estimated heading error is less than a heading error threshold, and if the estimated yaw rate is less than a yaw rate threshold:

$$S = \frac{Y - Y_T}{Y_T}\left(\frac{H - H_T}{H_T}\right)\left(\frac{L - L_T}{L_T}\right),$$

where S is the scalar estimated stability factor, Y is the estimated yaw rate, $Y_T$ is the yaw rate threshold, H is the heading error and $H_T$ is the heading error threshold, L is the lateral error and $L_T$ is the lateral error threshold.

15. The method according to claim 10 wherein the estimated stability factor is set to zero during acquisition of a target guidance path of the vehicle and wherein the stability evaluator is adapted to increase the estimated stability factor after acquisition of the target guidance path with less than a lateral error from the target guidance path.

16. The method according to claim 10 further comprising determining a percent wheel slip as the wheel slip by multiplied the wheel slip indicator by 100.

17. The method according to claim 1 wherein the estimated velocity determined based on three-dimensional velocity vectors and position of the vehicle, and wherein the rotational speed of the wheels of the vehicle is based on application of geometric conversions associated with tire size and gear ratios of the drive train to the observed rotational sensor data.

18. The method according to claim 10 further comprising displaying the determined performance rating to a user of the vehicle in real time.

19. The method according to claim 10 wherein the determined performance rating further comprises a contribution from a steering authority index based on the correlation (R-squared) of desired vehicle curvature (wheel angle/wheel base) to actual vehicle curvature (yaw-rate/location-determining-receiver-provided speed) plus a time delta.

* * * * *